United States Patent [19]

Larsen et al.

[11] 4,088,337
[45] May 9, 1978

[54] EQUIPMENT-MOVING DOLLY

[76] Inventors: Walter L. Larsen; William L. Larsen, both of 1345 Lavenida, Mountain View, Calif. 94040

[21] Appl. No.: 715,925

[22] Filed: Aug. 19, 1976

[51] Int. Cl.² .............................................. B62B 1/00
[52] U.S. Cl. .................................. 280/79.1 R; 280/677
[58] Field of Search .......................... 280/677, 79.1 R; 301/98

[56] References Cited

U.S. PATENT DOCUMENTS

| | | | |
|---|---|---|---|
| 1,015,864 | 1/1912 | Williams | 301/98 |
| 2,370,548 | 2/1945 | Kordes | 280/79.1 R |
| 2,713,179 | 7/1955 | Clifton | 280/79.1 R |

Primary Examiner—Philip Goodman
Attorney, Agent, or Firm—Warren M. Becker

[57] ABSTRACT

An equipment-moving dolly comprising a walking beam having a rigid planar member with a planar surface, said planar member having attached thereto, approximately perpendicular to the planar surface, one or more rigid, weight-bearing arms, said arms terminating in a means for attaching the walking beam to a carriage base; a carriage base having a rigid member, said rigid member having attached thereto two or more rigid, weight-bearing struts, including a pair of outer struts approximately perpendicular to a plane taken through the carriage base, with each strut parallel to the other struts, said outer struts having a means for pivotably attaching said walking beam to said carriage base for allowing the walking beam to pivot relative to said carriage base, and having a means for attaching said struts to a roller assembly; and a roller assembly comprising two or more roller devices in tandem having a means for individually attaching each roller device to the struts of the carriage base.

7 Claims, 7 Drawing Figures

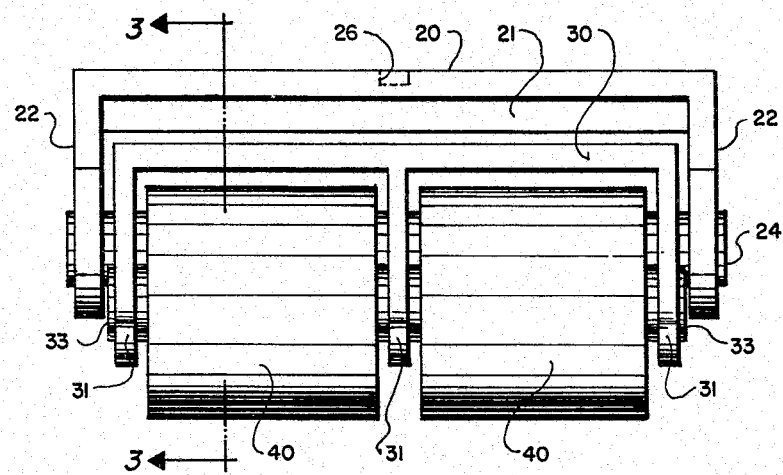
FIG. 4
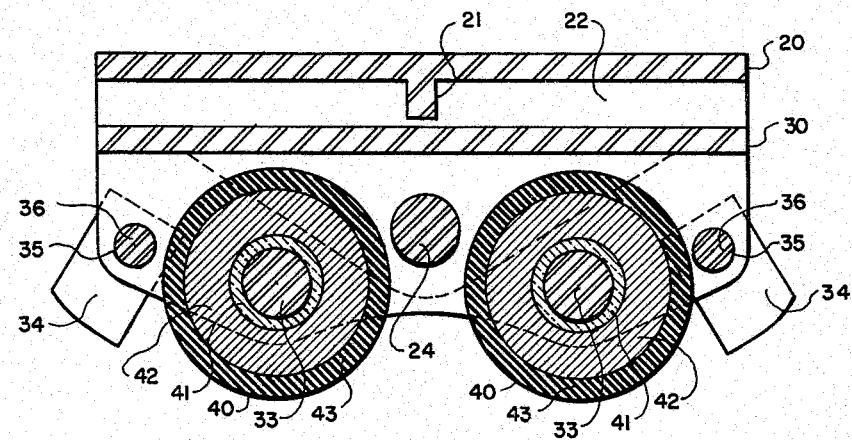
FIG. 3
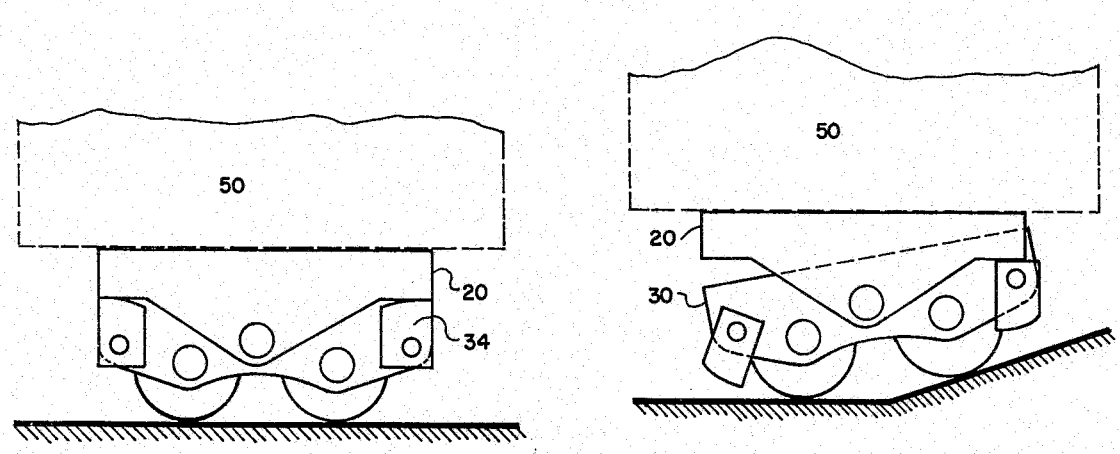
FIG. 5
FIG. 6

EQUIPMENT-MOVING DOLLY

BACKGROUND OF THE INVENTION

A widely used prior known dolly has a roller assembly having a caterpillar type tread comprising a plurality of small-diameter, steel rollers connected at their ends by a chain to form a continuous belt. Such dollies are able to move very heavy weights, but are easily stopped by small surface irregularities. For example, when the dolly is carrying a heavy load, an object as thin as a dime may stop forward movement. Forward movement may also be stopped by an abrupt upward change in the plane of travel of the dolly. When such an uneven surface or incline is encountered, the entire load being carried by the dolly is shifted to those roller(s) still in contact with the surface over which the load is being moved. Those rollers still in contact with the surface must be able to support the weight of the entire load being carried by the dolly, necessitating the use of larger rollers. Additionally, due to the small diameter of the rollers commonly employed in dollies, small irregularities in the surface over which the dolly is passing will have a magnified effect upon the amount of energy required to move the loaded dolly over the irregular area or inclined surface. To overcome these problems, a larger dolly may be used and/or a greatly increased force may be applied to moving the load. It is apparent that neither of these solutions is economically attractive. Additionally, it may prove to be difficult to switch dollies during transit with a load, especially when the load is fragile and easily damaged by the additional handling required. In other circumstances, the application of a greater force to move the load may not be feasible due to the unavailability of the additional power.

A second problem encountered in known equipment-moving dollies results from the use of steel wheels or rollers in their construction. This causes two problems. First, the steel rollers may be very injurious to the surface over which they travel, especially to tiled surfaces commonly encountered in office buildings and the like. A second problem with steel wheels is their ability to transmit the unevenness of the floor to the equipment in the form of shock waves which may not be tolerated by sensitive equipment, such as electronic equipment, computers and the like.

The present invention relates to an improved equipment-moving dolly which equalizes the weight of the load over all of the rollers of the carriage base.

A separate embodiment is the means for immobilizing the weight-equalizing means.

Another embodiment of the invention is the use of elastomeric rollers to reduce damage to sensitive substrates such as tile floors as well as minimize the transmission of shock waves through the rollers.

BRIEF DESCRIPTION OF THE DRAWINGS

FIG. 3 is a sectional side view of the equipment-moving dolly.

FIG. 4 is an end view of the equipment-moving dolly.

FIG. 5 is a side view of a loaded equipment-moving dolly with the walking beam immobilized moving over a level, regular surface.

FIG. 6 is a side view of a loaded equipment-moving dolly with the walking beam free, moving up an inclined surface.

DETAILED DESCRIPTION OF THE INVENTION AND DRAWINGS

Figure 1:
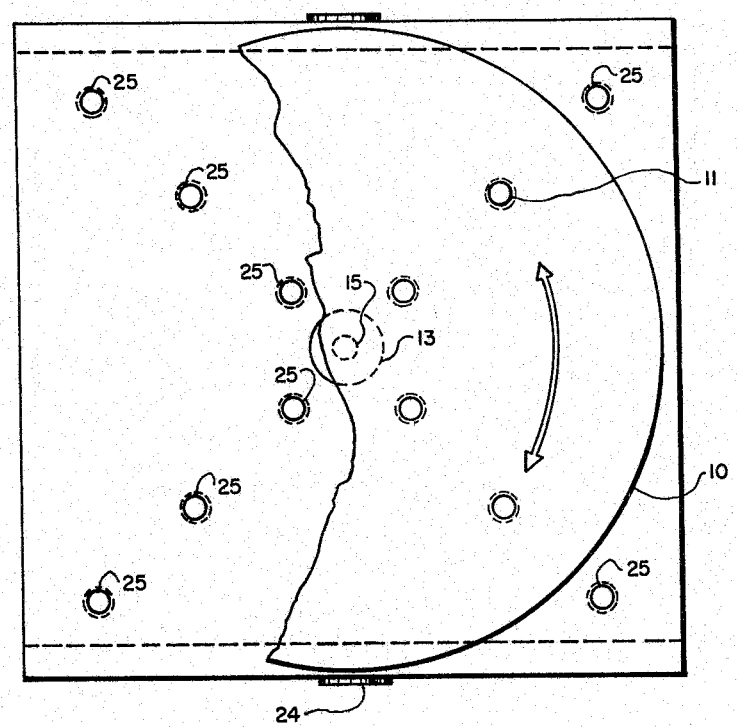
FIG. 1 is a top view of the equipment-moving dolly showing a partially cut-away swivel.
Figures 2, 2A:
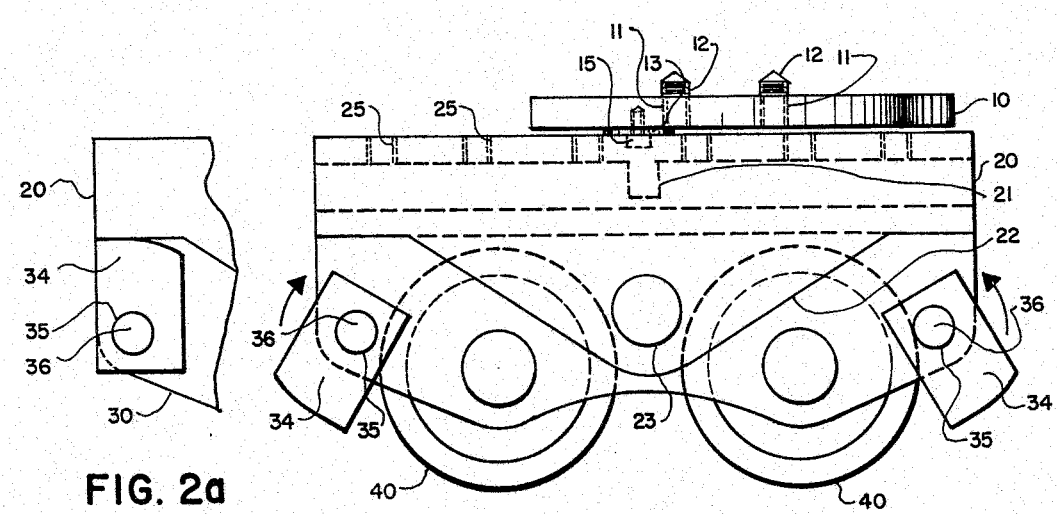
FIG. 2 is a side view of the equipment-moving dolly with the walking beam free, showing a partially cut-away swivel.
FIG. 2a is a partial side view of the equipment-moving dolly, showing the position of a peg when the walking beam is immobilized.

Referring to FIGS. 1 and 2, there is provided in an equipment-moving dolly according to the present invention a partially cut-away swivel plate 10. Plate 10 is pivotably mounted to the center of a walking beam 20 by means of a downwardly extending bolt 15. The bolt 15 is passed through a clearance washer 13. Washer 13 provides a clearance between the plate 10 and the upper surface of the beam 20 so that the plate 10 can be swiveled parallel to the beam 20.

The swivel plate 10 has a series of sockets 11 in its upper surface into which a plurality of studs 12 may be inserted. Studs 12, together with a plywood board or the like (not shown) inserted between a load and the studs, aid in preventing a shifting of the load on the dolly. The upper surface of the walking beam 20 also has a series of sockets 25 into which the studs 12 may be inserted when the swivel plate 10 is removed.

As shown in FIG. 2, the walking beam 20 has a transversely extending reinforcing rib 21 located under its center and a plurality of downwardly extending, weight-bearing arms 22 located on both sides which contain a walking beam axle hub 23 for receiving a walking beam axle 24.

The walking beam 20 is pivotably supported on a carriage base 30. The carriage base 30 has a plurality of weight-bearing struts 31, which are used to attach the walking beam 20 to a roller assembly comprising a plurality of rollers 40. Each of the rollers 40 comprise heavy duty members having a carrying capacity of 750 pounds, such as, for example, a roller of that capacity made by the R.K. Wheels Company of Richmond, Calif. Each of the struts 31 contains a roller axle hub 32 for receiving a roller axle 33. Attached to the outer sides of the struts 31 are a plurality of pegs 34. Each of the pegs 34 is used to immobilize the walking beam 20 and contains a peg bolt hub 35 through which a peg bolt 36 passes. In use, the pegs 34 are rotated about the bolt 36 to engage an under surface of the beam 20 to immobilize the beam.

FIG. 2a illustrates the position of the pegs 34 when they are rotated about the bolt 36 to abut an under surface of the beam 20 to immobilize the beam 20.

FIG. 3 is a sectional side view of the equipment-moving dolly of FIGS. 1 and 2, taken through a plane indicated by lines 3—3 of FIG. 4.

Referring to FIGS. 3 and 4, there is provided above the reinforcing rib 21 of beam 20 a socket 26 for receiving the central support bolt 15 of the swivel plate 10.

Each of the rollers 40 has a bushing 41 centrally mounted in a roller body 42, a rim 43 and rotates about the roller axle 33 which passes through the bushing 41. The bushing 41 is not critical and may be a simple sleeve, a roller bearing or similar friction-reducing device. The central body 42 of the roller is also not critical and may be of any suitable material which is capable of supporting the desired load. The rim 43 of the roller may be made of any suitable material, but in one aspect of the present invention is an elastomeric material capable of passing over tile floors without damage to the floor.

FIG. 5 is a side view of an equipment-moving dolly carrying a load 50 over a level, regular surface with the walking beam 20 immobilized by the pegs 34.

FIG. 6 is a side view of an equipment-moving dolly carrying a load 50 up an inclined surface with the walking beam 20 free and at an angle to the carriage base 30. The pegs 34 are down.

In an alternative embodiment of the invention, means (not shown) may be provided for equalizing the load about the longitudinal or roll axis as well as lateral axes. This may be done, for example, by providing a longitudinally extending shaft on the top of the beam 20 and pivotably mounting a rigid plate thereto in any suitable manner.

In practice, the non-roller parts of the equipment-moving dolly may be made out of conventional materials using conventional techniques. For example, the parts may be made of cast steel, forged steel or welded steel construction. If lighter weight parts of lesser durability are desired, these parts may be constructed from a fiber-reinforced plastic. Examples of suitable fibers are boron, carbon and glass. Examples of suitable plastics are polyesters, polyurethanes, epoxides and polyethers.

The rollers may be constructed of steel or preferably an elastomer. The rollers may be part of an endless belt which rotates about a race or they may be conventional wheels containing a bearing to reduce friction. The bearing may be either of a roller or ball-type construction. The elastomer may be reinforced with a filler, such as carbon black or unreinforced. The elastomer used may be natural rubber or a synthetic elastomer such as styrene-butadiene rubber, polyurethane rubber, neoprene rubber or nitrile rubber.

A dolly having a dual tandem set of rollers is described having a carrying capacity of about 3,000 pounds. It is contemplated that a greater carrying capacity may be achieved without departing from the spirit of the invention by the placing of an additional pair of rollers in tandem laterally of the rollers described.

In use, the equipment to be moved is raised to a height sufficient to place two or more dollies under the equipment.

The movement of a rectangular piece of equipment may be accomplished by using three dollies. The dollies may be either three swivel-topped or a combination of one swivel-topped and two non-swivel-topped, depending on the degree of directional control required. Under certain circumstances, four dollies may be employed. However, the problem with using four dollies is that one of the dollies may slip out from under the load if the load should tilt. This could result in a heavy load turning over. When heavy equipment is being moved without skidding, a slippage problem may occur if the dollies are in direct contact with the metal equipment. Several solutions may be employed to alleviate the slippage problem: non-skid rubber pads may be used on the top of the dollies and under the load, heavy cardboard or soft wood planks may be placed between the dollies and the load, the dollies may be supplied with studs and/or the walking beam may be drilled and tapped for temporary bolting.

At the destination, the reverse sequence of the loading procedure is employed to remove the equipment from the dollies.

When an irregular or inclined surface is encountered, the walking beam 20 pivots about the carriage base 30 keeping the weight of the equipment on the entire roller assembly. Should the surface be regular, the walking beam 20 may be immobilized by rotating the pegs 34 to the upper position.

While there have been described and pointed out the fundamental novel features of the invention as applied to the preferred embodiments, those skilled in the art will appreciate that various changes and modifications and omissions from the equipment-moving dolly may be made without departing from the spirit of the invention. It is the intention, therefore, to be limited only by the scope of the claims which follow.

What is claimed is:

1. An equipment-moving dolly comprising: a walking beam having a rigid, planar member with a planar surface, said planar member having attached thereto approximately perpendicular to the planar surface one or more rigid, weight-bearing arms, said arms terminating in a means for attaching the walking beam to a carriage base;

a carriage base having a rigid member, said rigid member having attached thereto two or more rigid, weight-bearing struts, including a pair of outer struts, approximately perpendicular to a plane taken through the carriage base with each strut parallel to the other struts, said outer struts having a means for pivotably attaching said walking beam to said carriage base for allowing the walking beam to pivot relative to said carriage base, and having a means for attaching said struts to a roller assembly;

a roller assembly comprising two or more roller devices in tandem, having a means for individually attaching each roller device to the struts of said carriage base; and means for temporarily preventing a pivoting of the walking beam relative to the carriage base.

2. The equipment-moving dolly of claim 1 wherein each of said roller devices comprises a rim and said rim is made of an elastomeric material.

3. The equipment-moving dolly of claim 1 further comprising means rotatably supported on said planar surface of said walking beam for rotation relative to said planar surface; means for removing the rotatably supported means from the planar surface; and means for removably inserting a plurality of stud members in the surface of the rotatably supported means and in the planar surface when the rotatably supported means is removed therefrom for preventing a slippage of a load therefrom.

4. The equipment-moving dolly of claim 1 wherein the roller assembly comprises four elastomeric rollers.

5. An equipment-moving dolly comprising: a walking beam having a rigid, planar member with a planar surface, said planar member having integrally attached thereto at the balance axis two rigid, weight-bearing arms attached to opposite sides of the beam and approximately perpendicular to the planar surface, said arms terminating in a means for attaching the walking beam to the carriage base for pivoting about its pitch axis;

a carriage base having a rigid member, said rigid member having integrally attached thereto three rigid, weight-bearing struts approximately perpendicular to a plane taken through the carriage base with each strut parallel to the other struts, said struts having a means for attaching said struts to a roller assembly, said struts having a means for pivotably attaching said walking beam to said carriage base allowing the walking beam to pivot about the pitch axis of said carriage base;

a roller assembly comprising four rollers in a parallel tandem pair having an inner friction-reducing means and an elastomeric rim, each roller having a means for attaching the roller between a pair of struts of the carriage base; and means for temporarily preventing a pivoting of the walking beam relative to the carriage base.

6. The equipment-moving dolly of claim 1 wherein the means for temporarily preventing a pivoting of the walking beam relative to the carriage base comprises a movable member attached to the carriage base having a first position for temporarily maintaining the planar surface of the walking beam parallel to the plane of movement of the carriage base and a second position for allowing the planar surface of the walking beam to rotate relative to the plane of movement of the carriage base.

7. The equipment-moving dolly of claim 5 comprising a load-bearing surface and means for removably inserting a plurality of stud members in the load-bearing surface for preventing the slippage of a load therefrom.

* * * * *